(12) United States Patent
Arai et al.

(10) Patent No.: US 6,542,050 B1
(45) Date of Patent: Apr. 1, 2003

(54) TRANSMITTER-RECEIVER

(75) Inventors: Hiroyuki Arai, Yokohama (JP);
Kazuyuki Mizuno, Tokoname (JP);
Yasuhiko Mizutani, Komaki (JP);
Takami Hirai, Nishikamo-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/528,735

(22) Filed: Mar. 20, 2000

(30) Foreign Application Priority Data

Mar. 30, 1999 (JP) .......................................... 11-089848

(51) Int. Cl.$^7$ ................................................ H01P 5/12
(52) U.S. Cl. ................................ 333/134; 343/700 MS
(58) Field of Search ................................ 333/134, 129, 333/126, 132; 343/700 MS

(56) References Cited

U.S. PATENT DOCUMENTS 5,554,960 A * 9/1996 Ohnuki et al. .............. 333/132
5,898,403 A * 4/1999 Saitoh et al. .......... 343/700 MS
6,263,193 B1 * 7/2001 Iseki et al. ..................... 455/73
6,313,797 B1 * 11/2001 Kurita et al. .......... 343/700 MS
6,351,239 B1 * 2/2002 Mizuno et al. ........ 343/700 MS
6,426,725 B2 * 7/2002 Hiroshima et al. ......... 343/741

* cited by examiner

*Primary Examiner*—Robert Pascal
*Assistant Examiner*—Dean Takaoka
(74) *Attorney, Agent, or Firm*—Burr & Brown

(57) ABSTRACT

A transmitter 18 and a receiver 24 are formed integrally with a dielectric substrate 12. The transmitter 18 includes a transmitter filter 14 and a transmitter antenna 16 connected to the transmitter filter 14. The receiver 24 includes a receiver filter 20 and a receiver antenna 22 connected to the receiver filter 20. The transmitter filter 14 is formed with resonant elements 30a–30c arranged parallel to each other. The transmitter antenna 16 includes an antenna 32 formed from an electrode film on the upper surface of the receiver filter 20. The receiver filter 20 is formed from resonant elements 34a–34c arranged parallel to each other. The receiver antenna 22 includes an antenna 36 formed from an electrode film on the upper surface of the dielectric substrate 12.

39 Claims, 19 Drawing Sheets

TRANSMITTER-RECEIVER

BACKGROUND OF THE INVENTION

The present invention relates to a transmitter-receiver that includes a transmitter filter and a receiver filter with different center frequencies.

High-frequency wireless devices such as mobile phones generally use different frequencies for transmitting and receiving. In such cases, since the transmitter-receiver uses a single antenna, a duplexer is required. A duplexer essentially includes a transmitter filter and a receiver filter.

A transmitter filter is set up so that signals in the transmission band can pass and signals in the reception band are attenuated to prevent leakage of the signal from the power amp into the reception band. The receiver filter is set up so that it allows signals in the reception band to pass and signals in the transmission band are attenuated to prevent the transmission signals from the power amp from saturating the low-noise amplifier.

However, in mobile phones of recent years, the reception band and the transmission band are close together in frequency. Thus, in order to provide adequate transmission-reception separation, i.e., attenuation of the reception band by the transmitter filter and attenuation of the transmitter band by the receiver filter, measures had to be taken such as making the resonator used in the filter larger to increase the Q value.

Such methods lead to larger duplexers and complex structures, which can lead to increases in the production costs for transmitter-receivers.

SUMMARY OF THE PRESENT INVENTION

It is an object of the present invention to overcome these problems and to provide a transmitter-receiver that can: perform adequate transmission-reception separation using a simple structure; make the transmitter-receiver itself more compact; and simplify the structure and reduce production costs.

A transmitter-receiver according to a first embodiment of the present invention comprises a transmitter including a transmitter element having a transmitter filter and a transmitter antenna connected to the transmitter filter, a receiver including a receiver element having a receiver filter and a receiver antenna connected to the receiver filter, and signal processing means for processing signals transmitted by the transmitter and received by the receiver.

Since each of the transmitter and receiver includes a dedicated antenna, the above-discussed problems with the prior art can be overcome. This allows at least 10 dB of isolation between the transmission band and the reception band. By providing this isolation, the attenuation demands on the filters are reduced, and the transmitter filter and the receiver filter can be made compact. As a result, adequate separation of transmission signals and reception signals can be provided with a simple structure, the transmitter-receiver itself can be made compact, the structure can be simplified, and the production costs can be reduced.

The transmitter and receiver preferably take the form of a subassembly, wherein the transmitter element and the receiver element are both positioned on a substrate, and the transmitter filter and the transmitter antenna are formed integrally in a first monolithic dielectric body, and the receiver filter and the receiver antenna are formed integrally in a second monolithic dielectric body.

More preferably, the transmitter element and the receiver element take the form of a discrete component, wherein the transmitter element and the receiver element are formed integrally in a single monolithic dielectric body.

In each of the above, it is preferred that the filter and antenna of each of the transmitter and receiver elements are formed in separate planar regions of the dielectric body. It is also possible to have the transmitter antenna formed directly above the transmitter filter, separated by a dielectric layer, and to have the receiver antenna formed directly above the receiver filter, separated by a dielectric layer. In this case, the transmitter-receiver itself can be made even more compact.

It is also preferred to provide a shield electrode between the transmitter element and the receiver element. More preferably, a gap is provided between the transmitter element and the receiver element, and a shield electrode is formed at least on an inner perimeter surface of the gap.

It is also possible for the receiver element to include at least two receiver filters and at least two receiver antennae connected to the receiver filters, respectively. In this case, the signal processing means would include a switching mechanism for selecting one of the two receiver filters based on sensitivity.

A transmitter-receiver according to a second embodiment of the present invention comprises a substrate, a transmitter element positioned on the substrate and a receiver element positioned on the substrate. The transmitter element includes a transmitter filter and a transmitter antenna connected to the transmitter filter, the transmitter filter and transmitter antenna being formed integrally in a first monolithic dielectric body. The receiver element includes a receiver filter and a receiver antenna connected to the receiver filter, the receiver filter and receiver antenna being formed integrally in a second monolithic dielectric body.

In a transmitter-receiver according to a third embodiment of the present invention, the transmitter filter is formed on a first transmitter dielectric body, the transmitter antenna is formed on a separate, second transmitter dielectric body, the receiver filter is formed on a first receiver dielectric body, and the receiver antenna is formed on a separate, second receiver dielectric body.

The dielectric material is preferably an inorganic material, because these dielectric materials have high reliability and large dielectric constant, the latter enabling size reduction of both the filter and the antenna. Low resistivity metals, such as Ag and Cu, are preferable as the conductor embedded in the dielectric material to reduce the loss at the filter and the antenna. Such low resistivity conductor materials often have low melting temperatures (e.g., about 950° C.), thus making it difficult to co-fire the conductors with conventional ceramic dielectric materials. Accordingly, of the known inorganic dielectric materials, it is most preferred to use dielectric materials which can be fired at low temperature, such as glass materials (e.g., a mixture of cordierite glass, $TiO_2$ powder and $Nd_2Ti_2O_7$), and ceramic materials obtained by adding a slight amount of glass powder to a dielectric ceramic powder (e.g., barium oxide-titanium oxide-neodymium oxide).

It is also preferred that the spacing between the transmitter antenna and the receiver antenna be at least $\frac{1}{16}\lambda_{ave}$, wherein $\lambda_{ave}$ is the average wavelength of the transmitter signal and the receiver signal.

DETAILED DESCRIPTION OF THE PREFERRED EMBODIMENTS

Figure 1:
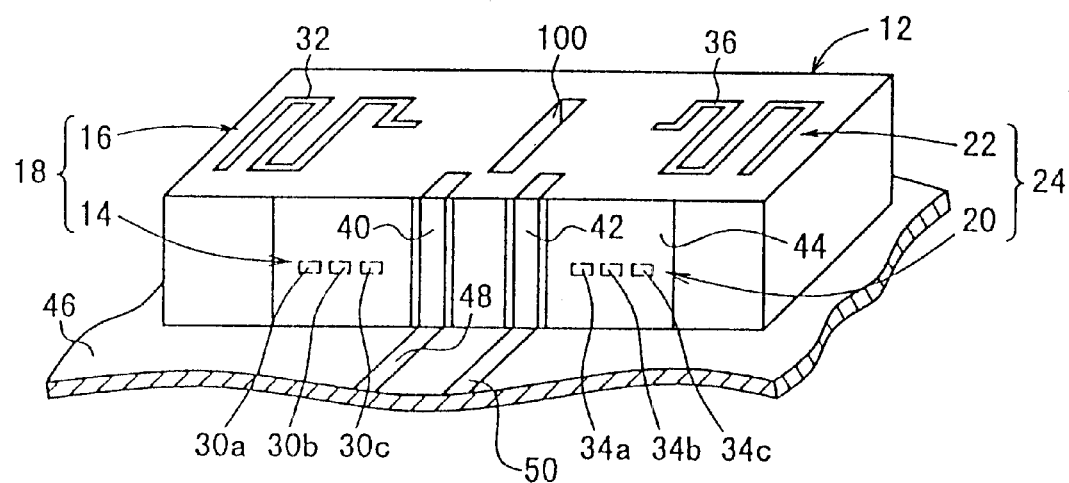
FIG. 1 is a perspective drawing showing the structure of a transmitter-receiver according to a first embodiment of the present invention.

The following is a description, with references to FIG. 1 through FIG. 19, of a number of embodiments of the receiver-transmitter according to the present invention.

In a receiver-transmitter 10A according to a first embodiment, a transmitter 18 and a receiver 24 are formed integrally. The transmitter 18 includes: a dielectric substrate 12 formed by firing a plurality of stacked dielectric sheets; a transmitter filter 14; and a transmitter antenna 16 connected to the transmitter filter 14. The receiver 24 includes: a receiver filter 20 and a receiver antenna 22 connected to the receiver filter 20. In the example shown for this embodiment, the transmitter 18 is disposed on the left side of the device and the receiver 24 is disposed on the right side of the device.

In the transmitter filter 14, three ¼-wavelength resonant elements 30a–30c, each of which is formed with one end open, are arranged parallel to each other. The transmitter antenna 16 includes an antenna 36 formed from an electrode film disposed on the upper surface of the dielectric substrate 12. In the receiver filter 20, three ¼-wavelength resonant elements 34a–34c, each of which is formed with one end open, are arranged parallel to each other. The receiver antenna 22 includes an antenna 36 formed from an electrode film disposed on the upper surface of the dielectric substrate 12.

Figure 2:
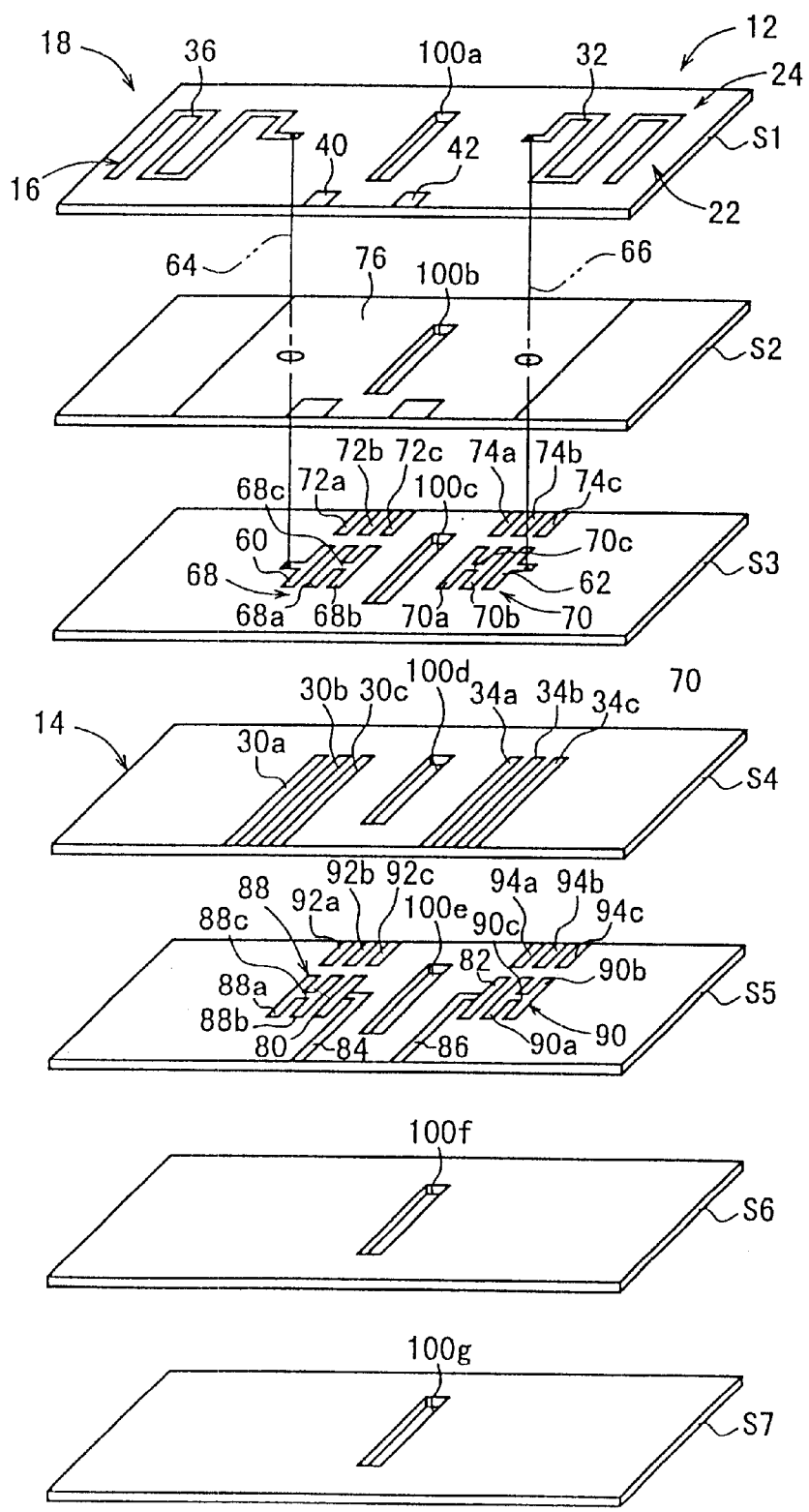
FIG. 2 is an exploded perspective drawing showing the structure of a transmitter-receiver according to the first embodiment.

With reference to FIG. 2, the dielectric substrate 12 preferably is formed as a stack consisting of, starting from the top, first through seventh dielectric layers S1–S7. These first through seventh dielectric layers S1–S7 form a single or a plurality of layers.

The transmitter antenna 16 and the transmitter filter 14 of the transmitter 18 are formed in separate planar regions of the dielectric substrate 12. The receiver antenna 22 and the receiver filter 20 of the receiver 24 are also formed in separate planar regions of the dielectric substrate 12. For example, in FIG. 1 the transmitter antenna 16 is formed to the left toward the outside, the transmitter filter 14 is formed to the left toward the center, the receiver antenna 22 is formed to the right toward the outside, and the receiver filter 20 is formed to the right toward the center. Furthermore, the transmitter antenna 16 and the receiver antenna 22 are formed on the upper surface of the first dielectric layer S1, and the transmitter filter 14 and the receiver filter 20 are formed on the second dielectric layer S2 through the seventh dielectric layer S7.

As shown in FIG. 1, a transmitter input terminal 40 is formed on the outer perimeter surface of the dielectric substrate 12, e.g., from the center to the left side of the front surface. Similarly, a receiver output terminal 42 is formed on the outer perimeter surface, e.g., from the center to the right side. A ground electrode 44 is formed on the outer side surface and the bottom surface, excluding where the terminals 40 and 42 are formed, at sections corresponding to the transmitter filter 14 and the receiver filter 20. Of course, a region is provided for insulation between the ground electrode 44 and the terminals 40 and 42.

When the transmitter-receiver 10A is mounted on a circuit substrate 46, an electrical connection is formed between the transmitter input terminal and a transmitter wiring circuit 48, an electrical connection is formed between the receiver output terminal 42 and a receiver wiring circuit 50, and an electrical connection is formed between the lower surface of the dielectric substrate 12 (the ground electrode 44) and a ground line not shown in the figure.

In the transmitter-receiver 10A according to the first embodiment, a primary surface of the fourth dielectric layer S4 is formed with three transmitter-side resonant elements (first through third resonant elements 30a–30c) arranged parallel to each other, and three receiver-side resonant elements (first through third resonant elements 34a–34c) arranged parallel to each other. These resonant elements 30a–30c and 34a–34c are formed with one open end and the other end is connected to the ground electrode 44.

On one primary surface of the third dielectric layer S3, which is positioned above the fourth dielectric layer S4, is formed a transmitter-side output electrode 60 and a receiver-side input electrode 62. One end of the transmitter-side output electrode 60 is passed through a through-hole 64 and is connected to the antenna 36 at the end where the transmitter antenna 16 is formed, and a capacitive coupling is formed with the first resonant element 30a on the transmitter side. One end of the receiver-side electrode 62 is passed through a through-hole 66 and is connected to the antenna 32 at the end where the receiver antenna 22 is formed, and a capacitive coupling is formed with the third resonant element 34c on the receiver side.

On one primary surface of the third dielectric layer S3 are formed two coupling adjuster electrodes (a first coupling adjuster electrode 68 on the transmitter side and a first coupling adjuster electrode 70 on the receiver side), which have floating potentials relative to the ground electrode 44, the transmitter input terminal 40, the receiver output terminal 42, and the like.

In the first coupling adjuster electrode 68 on the transmitter side, a first main electrode unit 68a aligned with the second resonant element 30b on the transmitter side and a second main electrode unit 68b aligned with the third resonant element 30c on the transmitter side are electrically connected by an electrode 68c formed therebetween.

In the first coupling adjuster electrode 70 on the receiver side, a first main electrode unit 70a aligned with the first resonant element 34a on the receiver side and a second main electrode unit 70b aligned with the second resonant element 34b on the receiver side are electrically connected by an electrode 70c formed therebetween.

Also, on one primary surface of the third dielectric layer S3, three inner layer ground electrodes 72a–72c are formed facing the open ends of the three resonant elements 30a–30c on the transmitter side, and three inner layer ground electrodes 74a–74c are formed facing the open ends of the three resonant elements 34a–34c on the receiver side.

On one primary surface of the second dielectric layer S2, which is positioned above the third dielectric layer S3, there is formed an inner layer ground electrode 76 connected to the outer surface ground electrode 44 at positions corresponding to the transmitter filter 14 and the receiver filter 20. The inner layer ground electrode 76 is structured so that the electrode is not formed around the through-holes 64 and 66 and the areas around the transmitter input terminal 40 and the receiver output terminal 42, thus providing isolation from the through-holes 64 and 66 and the terminals 40 and 42.

On one primary surface of the fifth dielectric layer S5, positioned below the fourth dielectric electrode S4, are formed a transmitter input electrode 80 and a receiver output electrode 82. The transmitter input electrode 80 is connected on one end to the transmitter input terminal 40 via an L-shaped electrode 84, and a capacitive coupling is formed with the third resonant element 30c on the transmitter side. The receiver output electrode 82 is connected on one end to the receiver output terminal 42 via an L-shaped electrode 86, and a capacitive coupling is formed with the first resonant element 34a on the receiver side.

On one primary surface of the fifth dielectric layer S5, are formed two coupling adjuster electrodes (a second coupling adjuster electrode 88 on the transmitter side and a second coupling adjuster electrode 90 on the receiver side), which have floating potentials relative to the ground electrode 44, the transmitter input terminal 40, the receiver output terminal 42, and the like.

In the second coupling adjuster electrode 88 on the transmitter side, a first main electrode unit 88a aligned with the first resonant element 30a on the transmitter side and a second main electrode unit 88b aligned with the second resonant element 30b on the transmitter side are electrically connected by an electrode 88c formed therebetween.

In the second coupling electrode 90 on the receiver side, a first main electrode unit 90a aligned with the second resonant element 34b on the receiver side and a second main electrode unit 90b aligned with the third resonant element 34c on the receiver side are electrically connected by an electrode 90c formed therebetween.

On one primary surface of the fifth dielectric layer S5, three inner layer ground electrodes 92a–92c are formed facing the open ends of the three resonant elements 30a–30c on the transmitter side, and three inner layer ground electrodes 94a–94c are formed facing the open ends of the three resonant elements 34a–34c on the receiver side.

Figure 3:
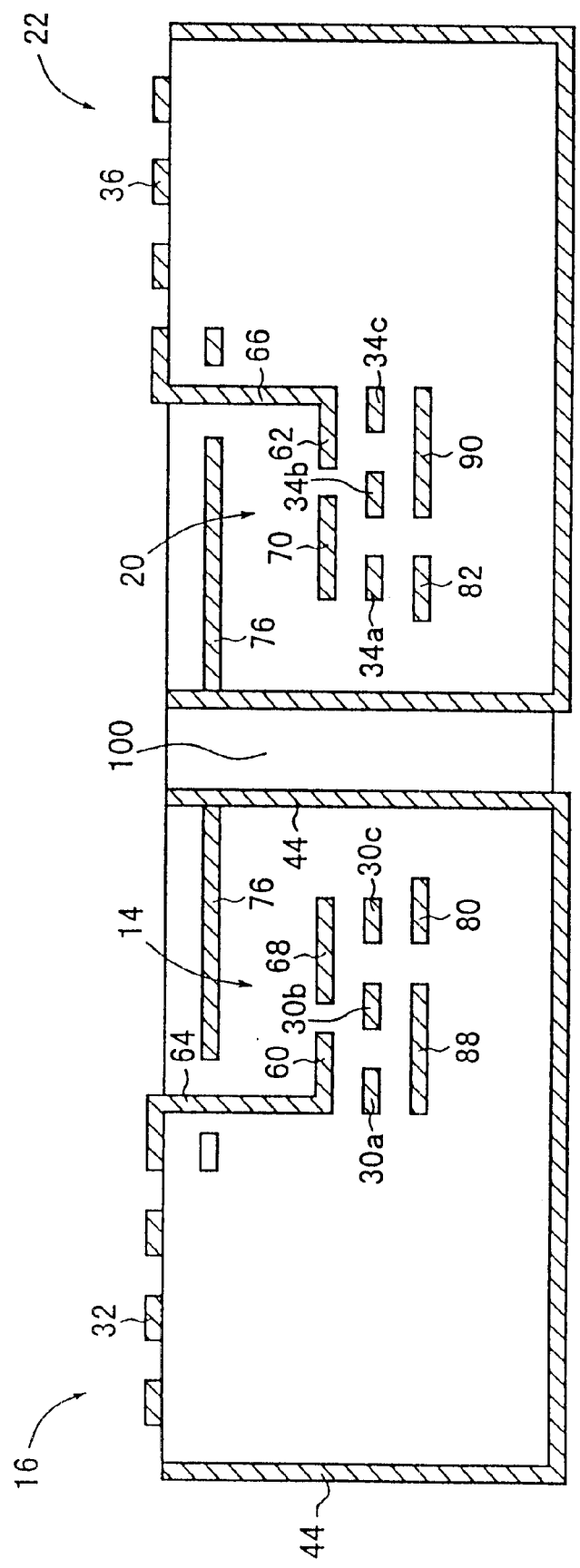
FIG. 3 is a vertical cross-section drawing showing the structure of a transmitter-receiver according to the first embodiment.
Figure 4:
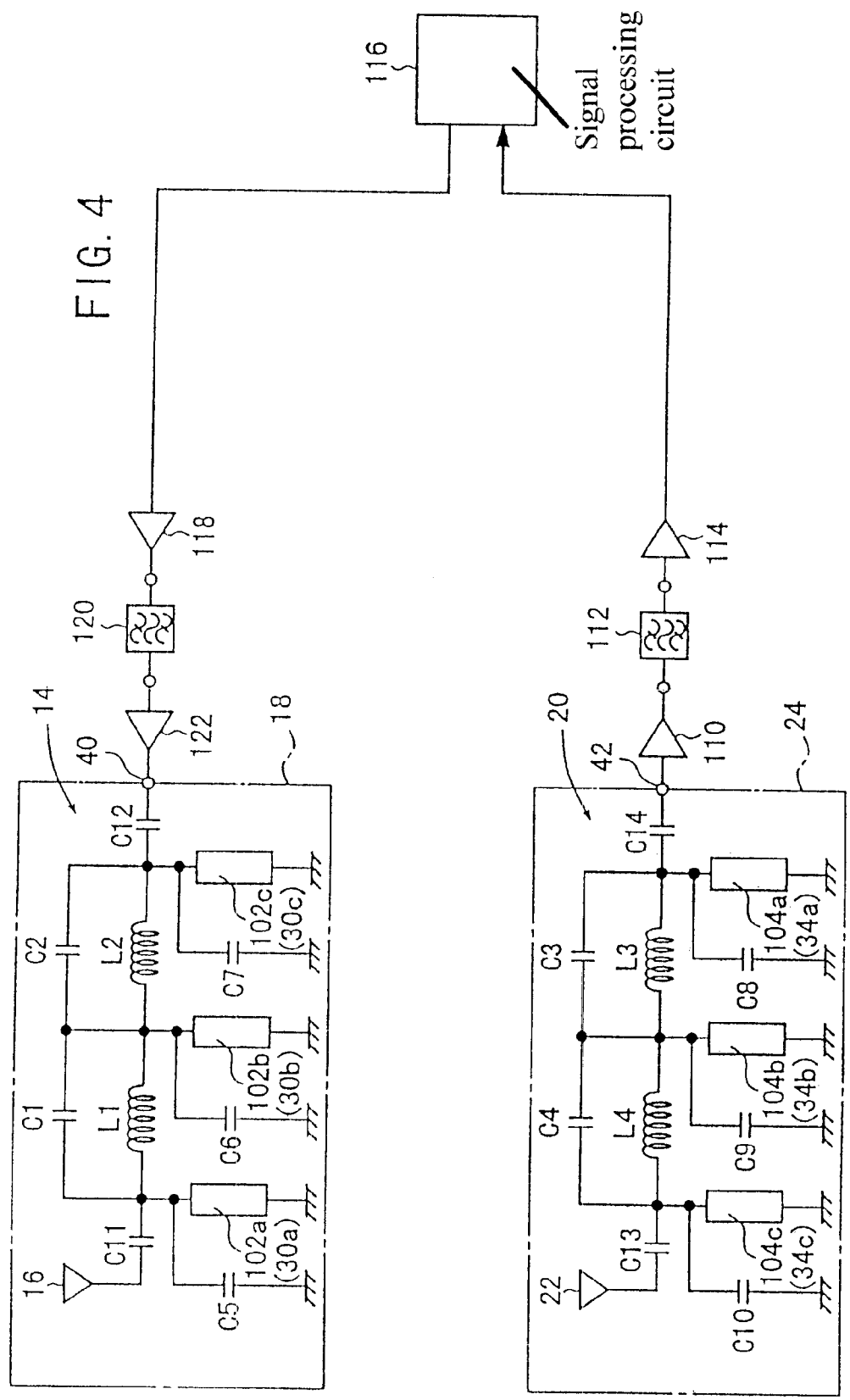
FIG. 4 is a drawing showing an equivalent circuit of a transmitter-receiver according to a first embodiment as well as a signal processor system connected to the circuit.

In the transmitter-receiver 10A according to the first embodiment, a gap 100 is formed between the receiver filter 14 and the transmitter filter 20, as shown in FIG. 1. As shown in FIG. 3, the ground electrode 44 is formed along the perimeter surface of the gap 100. Of course, it would also be possible to use an electrode member that fills the gap 100 to serve as he ground electrode 44.

Referring to FIG. 2, the gap 100 can be formed, for example, by using a die to punch holes 100a–100g into the first through the seventh dielectric layers S1–S7 forming the transmitter filter 14 and the receiver filter 20. Electrode members are then printed around these punched holes 100a–100g. It would be desirable to form the punched holes 100a–100g on the first through the seventh dielectric layers S1–S7 between where the transmitter filter 14 is formed and where the receiver filter 20 is formed, as shown in FIG. 2.

The transmitter-receiver 10A according to the first embodiment is essentially structured as described above. The following is a description of the electrical connections between the various electrodes, with references to the equivalent circuit diagram shown in FIG. 4.

In the transmitter 18, three resonators 102a–102c formed from the resonant elements 30a–30c are connected in parallel between the transmitter input terminal 40 and ground. The adjacent resonators 102a–102c are inductively coupled so that in the equivalent circuit this is represented as inductances L1 and L2 between adjacent resonators 102a–102c.

In the receiver 24, three resonators 104a–104c formed from the resonant elements 34a–34c are connected in parallel between the receiver output terminal 42 and ground. The adjacent resonators 104a–104c are inductively coupled so that in the equivalent circuit this is represented as inductances L3 and L4 between adjacent resonators 104a–104c.

A composite capacitance C1 is formed by the second coupling adjuster electrode 88 on the transmitter side between the first resonant element 30a and the second resonant element 30b on the transmitter side. A composite capacitance C2 is formed by the first coupling adjuster electrode 68 on the transmitter side between the second resonant element 30b and the third resonant element 30c on the transmitter side. Thus, an LC parallel resonance circuit formed by the inductance L1 and the capacitance C1 and an LC parallel resonance circuit formed by the inductance L2 and the capacitance C2 are connected between the resonators 102a–102c.

A composite capacitance C3 is formed by the first coupling adjuster electrode 70 on the receiver side between the first resonant element 34a and the second resonant element 34b on the receiver side. A composite capacitance C4 is formed by the second coupling adjuster electrode 90 on the receiver side between the second resonant element 34b and the third resonant element 34c on the receiver side. Thus, an LC parallel resonance circuit formed by the inductance L3 and the capacitance C3 and an LC parallel resonance circuit formed by the inductance L4 and the capacitance C4 are connected between the resonators 104a–104c.

Furthermore, capacitances (composite capacitances) C5–C7 are formed between the inner layer ground electrodes (72a, 92a), (72b, 92b), and (72c, 92c) corresponding to the open ends of the first through the third resonant elements 30a–30c on the transmitter side. Capacitances (composite capacitances) C8–C10 are formed between the inner layer ground electrodes (74a, 94a), (74b, 94b), and (74c, 94c) corresponding to the open ends of the first through the third resonant elements 34a–34c on the receiver side.

An electrostatic capacitance C11 is formed between the first resonant element 30a on the transmitter side and the transmitter antenna 16. An electrostatic capacitance C12 is formed between the third resonant element 30c on the transmitter side and the transmitter input terminal 40. An electrostatic capacitance C13 is formed between the third resonant element 34c on the receiver side and the receiver antenna 22. An electrostatic capacitance C14 is formed between the first resonant element 34a on the receiver side and the receiver output terminal 42.

The rear of the receiver output terminal 42 of the receiver 24 is connected to an amp 110, a filter 112, and an amp 114 via a signal processing circuit 116. The signal processing circuit 116 can, for example, be structured so that codes are extracted from the received signal and the signal is processed according to the codes.

Signals processed by the signal processing circuit 116 and converted for transmission are sent to the transmitter input terminal 40 of the transmitter 18 via an amp 118, a filter 120, and an amp 122 connected below the signal processing circuit 116. The transmission signal is sent out from the transmitter antenna 16 via the transmitter filter 14.

Thus, in the transmitter-receiver 10A according to the first embodiment, the transmitter antenna 16 and the receiver antenna 22 are disposed separately, and the transmitter 18, which includes the transmitter antenna 16 and the transmitter filter 14, and the receiver 24, which includes the receiver antenna 22 and the receiver filter 20, are disposed integrally on a single dielectric substrate 12. As a result, isolation of 10 dB or greater is provided between the transmission band and the reception band.

By maintaining this isolation, the attenuation requirements for the filters 14 and 20 are eased, thus allowing the transmitter filter 14 and the receiver filter 20 to be formed more compact. As a result, adequate separation of transmission and reception can be implemented with a simple structure, the transmitter-receiver 10A itself can be made more compact and simpler in structure, and production costs can be reduced.

More specifically, in this embodiment, the gap 100 is disposed between the transmitter filter 14 and the receiver filter 20, and the ground electrode is either formed at the perimeter surface of the gap 100 or embedded inside the gap 100. This strengthens the shielding between the transmitter filter 14 and the receiver filter 20.

Figure 5:
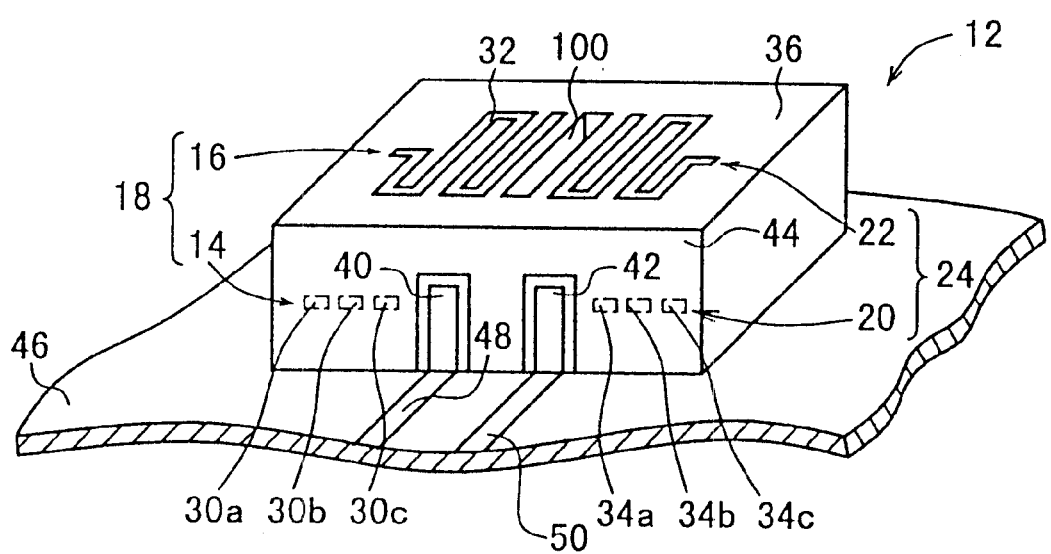
FIG. 5 is a perspective drawing showing the structure of a first alternative example of a transmitter-receiver according to the first embodiment.
Figure 6:
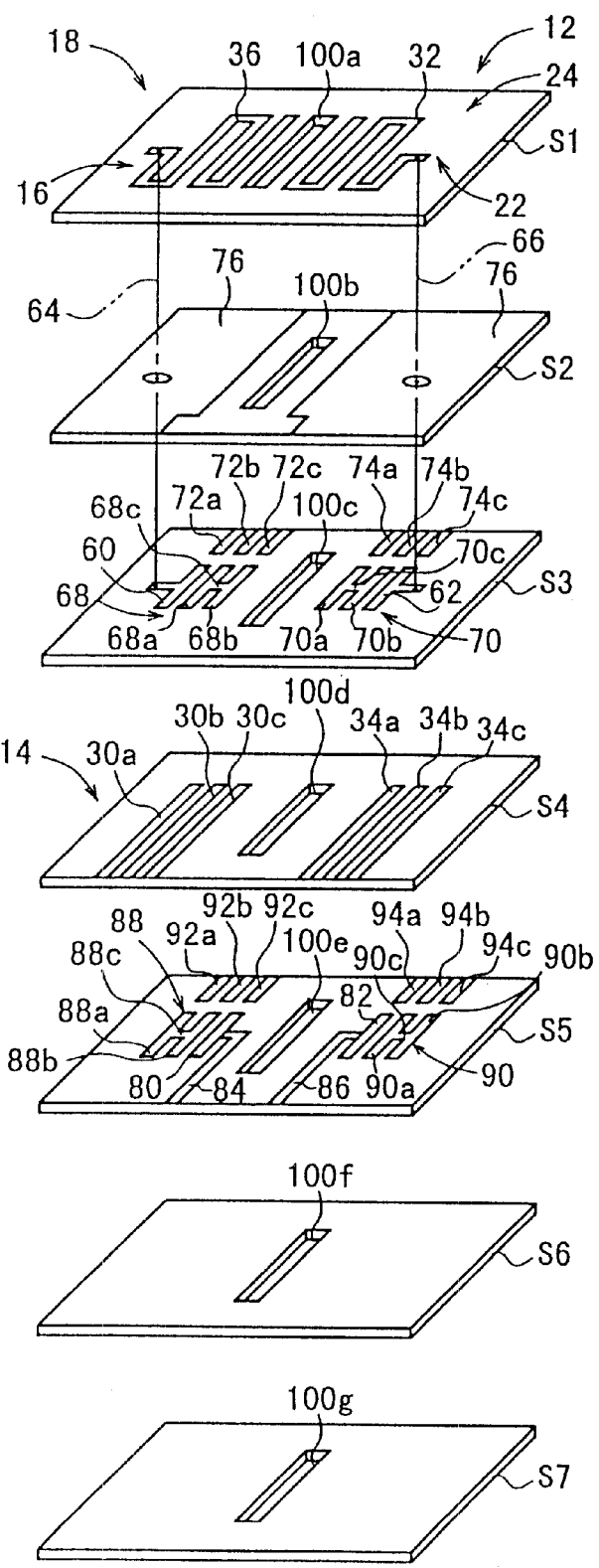
FIG. 6 is an exploded perspective drawing showing the structure of a first alternative example of a transmitter-receiver according to the first embodiment.
Figure 7:
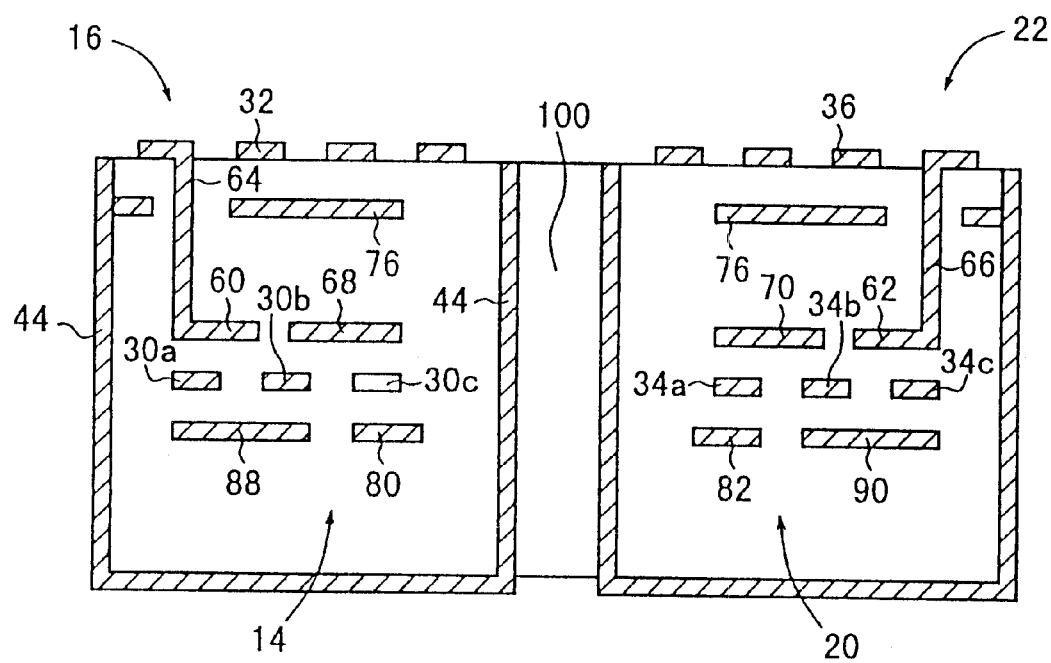
FIG. 7 is a vertical cross-section drawing showing the structure of a first alternative example of a transmitter-receiver according to the first embodiment.

The following is a description of a first alternative example of the transmitter-receiver 10A based on the first embodiment, with references to FIGS. 5–7. Elements that correspond to those from FIGS. 1–4 are assigned the same numerals and overlapping descriptions are omitted.

As shown in FIGS. 5–7, a transmitter-receiver 10Aa according to this first alternative example has roughly the same structure as the transmitter-receiver 10A according to the first embodiment (see FIG. 1). However, the first alternative example differs in that the transmitter antenna 16 is formed directly above the transmitter filter, and the receiver antenna 22 is formed directly above the receiver filter 20.

In the transmitter-receiver 10Aa according to this first alternative example, the ground electrode 44 is formed on the outer surface and the bottom surface of the outer perimeter surface of the dielectric substrate 12, excluding the transmitter input terminal 40 and the receiver output terminal 42. Of course, an area is provided for insulation between these terminals 40 and 42 and the ground electrode 44.

As shown in FIG. 6, the inner layer ground electrode 76 formed on a primary surface of the second dielectric layer S2 is formed so that it is interposed between the transmitter antenna 16 and the transmitter filter 14, as well as between the receiver antenna 22 and the receiver filter 20. In this case also, the inner layer ground electrode 76 does not cover the area around the through-holes 64 and 66 as well as the region around the transmitter input terminal 40 and the receiver output terminal 42. Thus, the through-holes 64 and 66 and the terminals 40 and 42 are kept isolated.

In the transmitter-receiver 10Aa according to this first alternative example, the transmitter antenna 16 is formed directly above the transmitter filter 14, and the receiver antenna 22 is formed directly above the receiver filter 20, thus allowing the transmitter-receiver 10Aa to be made even more compact.

Figure 8:
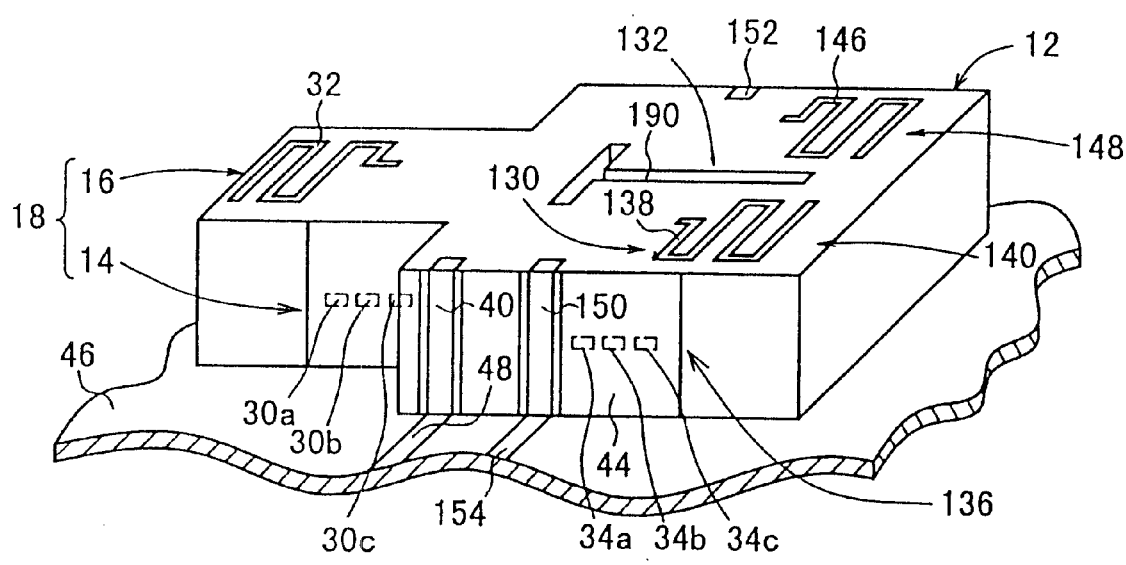
FIG. 8 is a perspective drawing of a second alternative example of a transmitter-receiver according to the first embodiment.
Figure 9:
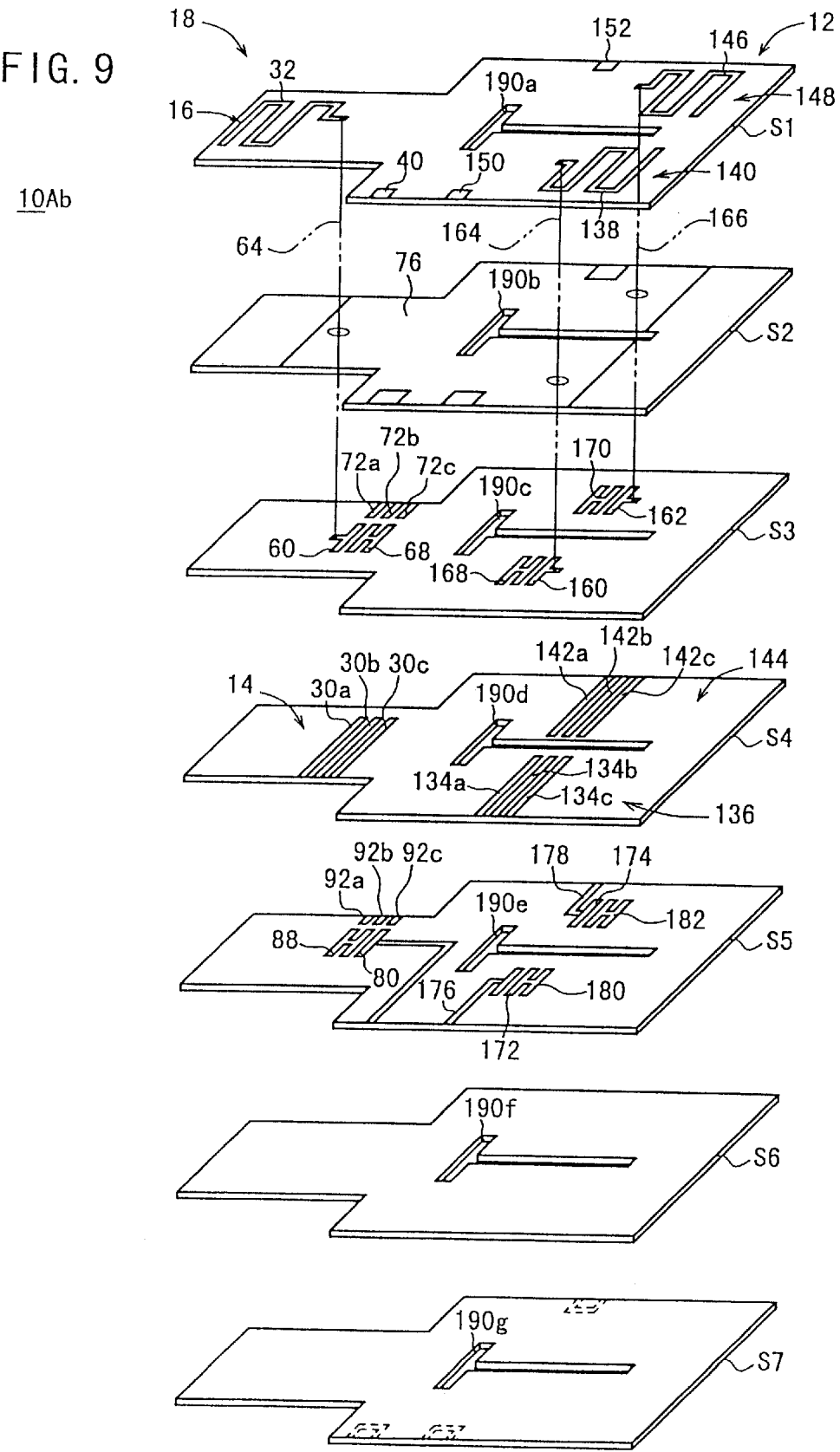
FIG. 9 is an exploded perspective drawing showing the structure of a second alternative example of a transmitter-receiver according to the first embodiment.
Figure 10:
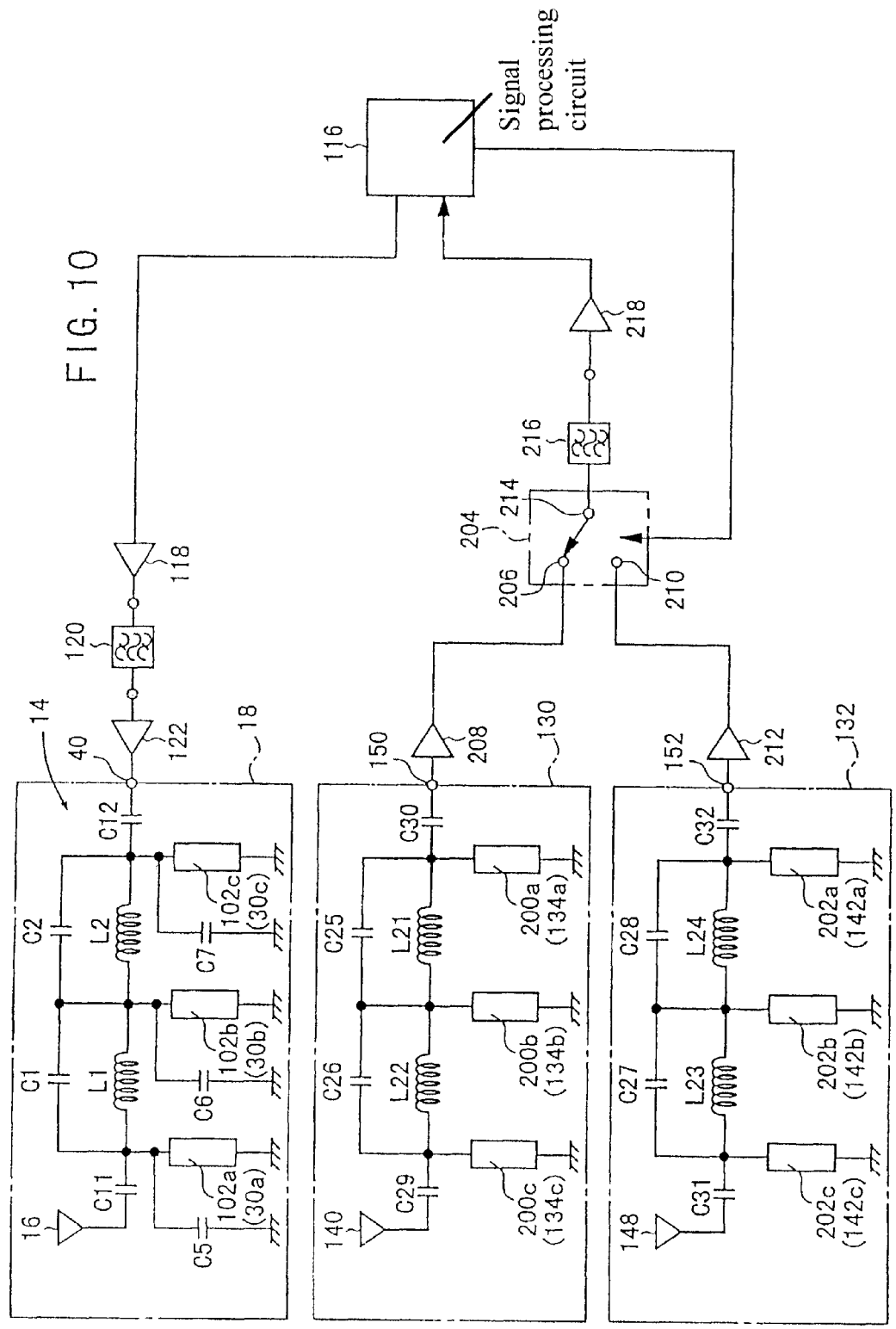
FIG. 10 is a drawing showing an equivalent circuit of a transmitter-receiver for a second alternative example according to the first embodiment as well as a signal processing system connected to the circuit.

The following is a description of a second alternative example of the transmitter-receiver receiver 10A according to the first embodiment, with references to FIGS. 8–10. Elements corresponding to those from FIGS. 1–4 are assigned the same numerals and overlapping descriptions are omitted.

A transmitter-receiver 10Ab according to this second alternative example has roughly the same structure as the transmitter-receiver 10A according to the first embodiment (see FIG. 1), but the second alternative example differs in that there is a single transmitter 18 and two receivers (first and second receivers 130 and 132). In the example of the second alternative example that is to be described, the transmitter 18 is disposed on the left side of the dielectric substrate 12, the first receiver 130 is formed on the right side toward the front, and the second receiver 132 is formed on the right side toward the rear.

Since the second alternative example is characterized as including the first and the second receivers 130 and 132, the description of the transmitter 18 will be omitted, and the following description will focus on the structure of the first and the second receivers 130 and 132.

The first receiver 130 includes a first receiver filter 136 and a first receiver antenna 140. The first receiver filter 136 is formed with three ¼ wavelength resonant elements 134a–134c, each of which has one open end, arranged parallel to each other. The first receiver antenna 140 is formed from an antenna 138 formed from an electrode film on the upper surface of the dielectric substrate 12.

The second receiver 132 includes a second receiver filter 144 and a second receiver antenna 148. The second receiver filter 144 is formed with three ¼ wavelength resonant elements 142a–142c, each of which has one open end, arranged parallel to each other. The second receiver antenna 148 is formed from an antenna 146 formed from an electrode film on the upper surface of the dielectric substrate 12.

In the transmitter-receiver 10Ab according to this second alternative example, the transmitter input terminal 40 is formed on the outer perimeter surface of the dielectric substrate 12, e.g., toward the front and to the left of the center. Similarly, a first receiver output terminal 150 is formed to the right of the center, and a second receiver output is formed toward the rear and to the right of the center. The ground electrode 44 is formed on the outer surface and the lower surface, excluding the terminals 40, 150, and 152, at areas corresponding to the transmitter filter 14 and the first and the second receiver filters 136 and 144. Of course, an area is provided so that the terminals 40, 150, and 152 and the ground electrode 44 are isolated from each other.

When the transmitter-receiver 10Ab according to this alternative example is mounted on the circuit substrate 46, electrical connections are formed between the transmitter input terminal 40 and the receiver circuit 48, between the first receiver output terminal 150 and the first receiver circuit 154, between the second receiver output terminal 152 and the second receiver circuit (not shown in the figure), and between the lower surface (the ground electrode) of the dielectric substrate 12 and a ground wire (not shown in the figure).

Also, in the transmitter-receiver 10Ab according to the second alternative example, the three resonant elements 134a–134c of the first receiver and the three resonant elements 142a–142c of the second receiver are arranged parallel to each other on a primary surface of the fourth dielectric layer S4. Each of these resonant elements 134a–134c and 142a–142c are formed with one end open and with the other end connected to the ground terminal 44.

On a primary surface of the third dielectric layer S3 are formed an output electrode 160 for the first receiver and an output electrode 162 for the second receiver. The output electrode 160 of the first receiver is connected on one end to one end of the antenna 138 of the first receiver antenna 140 via a through-hole 164, and a capacitive coupling is formed with the third resonant element 134c of the first receiver. The output electrode 162 of the second receiver is connected on one end to one end of the antenna 146 of the second receiver antenna 148 via a through-hole 166, and a capacitive coupling is formed with the third resonant element 142c of the second receiver.

On one primary surface of the third dielectric layer S3 are formed two coupling adjuster electrodes (a first coupling adjuster electrode 168 for the first receiver and a first coupling adjuster electrode 170 for the second receiver), which have floating potentials relative to the ground electrode 44, the transmitter input terminal 40, the first and the second receiver output terminals 150 and 152, and the like.

On one primary surface of the second dielectric surface S2, an inner layer ground electrode 76 connected to the outer surface ground electrode 44 is formed at the areas corresponding to the transmitter filter 14 and the first and the second receiver filters 136 and 144. The inner layer ground electrode 76 does not cover the area around the through-holes 64, 164, and 166, the transmitter input terminal 40, and the first and the second receiver output terminals 150 and 152. This keeps the through-holes 64, 164, and 166 and the terminals 40, 150, 152 isolated.

On one primary surface of the fifth dielectric layer S5 is formed a first receiver output electrode 172 and a second receiver output electrode 174. The first receiver output electrode 172 is connected to the first receiver output terminal 150 via an electrode 176 formed with one end bent in the shape of an L, and a capacitive coupling is formed with the first resonant element 134a of the first receiver. The output electrode 174 of the second receiver is connected to the second receiver output terminal 152 via an electrode 178 formed with one end bent in the shape of an L, and a capacitive coupling is formed with the first resonant element 142a of the second receiver.

On one primary surface of the fifth dielectric layer S5 are formed two coupling adjuster electrodes (a second coupling adjuster electrode 180 of the first receiver and a second coupling adjuster electrode 182 of the second receiver), which have floating potentials relative to the ground electrode 44, the transmitter input terminal 40, the first and the second receiver output terminals 150 and 152, and the like.

Furthermore, in the transmitter-receiver 10Ab according to the second alternative example, a gap 190, e.g., a T-shaped gap, is formed between the transmitter filter. 18 and the first receiver filter 130 and the second receiver filter 132, as shown in FIG. 8. The ground electrode 44 is formed around the perimeter of the gap 190. Of course, an electrode member that can be embedded into the gap 190 can be used for the ground electrode 44.

The gap 190 can be formed, for example, by punching holes 190a–190g on the first through the seventh dielectric layers S1–S7, as shown in FIG. 9. An electrode member is then printed along the perimeter surfaces of the punched holes 190a–190g.

The transmitter-receiver 10Ab according to the second alternative example is essentially structured as described above. The following is a description of the electrical connections of the electrodes, with reference to the equivalent circuit diagram shown in FIG. 10. The description will center on the first and the second receivers 130 and 132.

In the first receiver 130, the three resonators 200a–200c formed by the first through the third resonant elements 134a–134c are connected in parallel between the first receiver output terminal 150 and the ground. Furthermore, inductive coupling takes place between the adjacent resonators 200a–200c. As a result, in the equivalent circuit, inductances L21 and L22 are inserted between adjacent resonators 200a–200c.

In the second receiver 132, the three resonators 202a–202c formed by the first through the third resonant elements 142a–142c are connected in parallel between the second receiver output terminal 152 and the ground. Furthermore, inductive coupling takes place between the adjacent resonators 202a–202c. As a result, in the equivalent circuit, inductances L23 and L24 are inserted between adjacent resonators 202a–202c.

Between the first resonant element 134a and the second resonant element 134b of the first receiver, a composite capacitance C25 is formed by the first coupling adjuster electrode 168 of the first receiver. Between the second resonant element 134b of the first receiver and the third resonant element 134c, a composite capacitance C26 is formed by the second coupling adjuster electrode 180 of the receiver. Thus, an LC parallel resonance circuit formed by the inductance L21 and the capacitance C25 and an LC parallel resonance circuit formed by the inductance L22 and the capacitance C26 are connected between the resonators 200a–200c.

Between the first resonant element 142a and the second resonant element 142b of the second receiver, a composite capacitance C28 is formed by the first coupling adjuster electrode 170 of the second receiver. Between the second resonant element 142b and the third resonant element 142c of the second receiver, a composite capacitance C27 is formed by the second coupling adjuster electrode 182 of the second receiver. Thus, an LC parallel resonance circuit formed by the inductance L23 and the capacitance C27 and an LC parallel resonance circuit formed by the inductance L24 and the capacitance C28 are connected between the resonators 202a–202c.

Between the third resonant element 134c of the first receiver and the first receiver antenna 140 is formed an electrostatic capacitance C29. Between the first resonant element 134a of the first receiver and the first receiver output terminal 150 is formed an electrostatic capacitance C30. Between the third resonant element 142c of the second receiver and the second receiver antenna 148 is formed an electrostatic capacitance C31. Between the first resonant element 142a of the second receiver and the second receiver output terminal 152 is formed an electrostatic capacitance C32.

A switching circuit 204 is connected below the first receiver 130 and the second receiver 132. The switching circuit 204 selectively switches between the reception signal from the first receiver 130 and the reception signal from the second receiver 132 based on the attributes (potential level, current level, frequency, and the like) of the switching control signal from a switching control circuit (not shown in the figure) of the signal processing circuit 116.

A first fixed terminal 206 of the switching circuit 204 is connected to the first receiver 130 via an amp 208. A second fixed terminal 210 of the switching circuit 204 is connected to the second receiver 132 via an amp 212. The movable contact 214 of the switching circuit 204 is connected to the signal processing circuit 116 via a filter 216 and an amp 218. This switching circuit 204 can be formed from a semiconductor element such as an FET.

The switching control circuit in the signal processing circuit 116 varies the attributes of the switching control signal so that the reception signal having the higher sensitivity is selected, thus causing the movable contact 214 of the switching circuit 204 to be switched.

Thus, in the transmitter-receiver 10Ab according to the second alternative example, a single transmitter 18 and the two receivers 130 and 132 are formed integrally in the dielectric substrate 12. This allows adequate separation of reception and transmission signals using a simple structure. The transmitter-receiver 10Ab itself is made more compact with a simple structure, and production costs can be reduced. Furthermore, reception sensitivity can be improved since the switching circuit 204 is connected below the first and the second receivers 130 and 132 to select between the receiver 130 and 132 based on sensitivity.

In the transmitter-receiver 10Ab according to the second alternative example, there are two receivers 130 and 132. However, it would also be possible to have at least three receivers and to provide a multiplexer connected below the receivers to selectively switch receivers.

Figure 11:
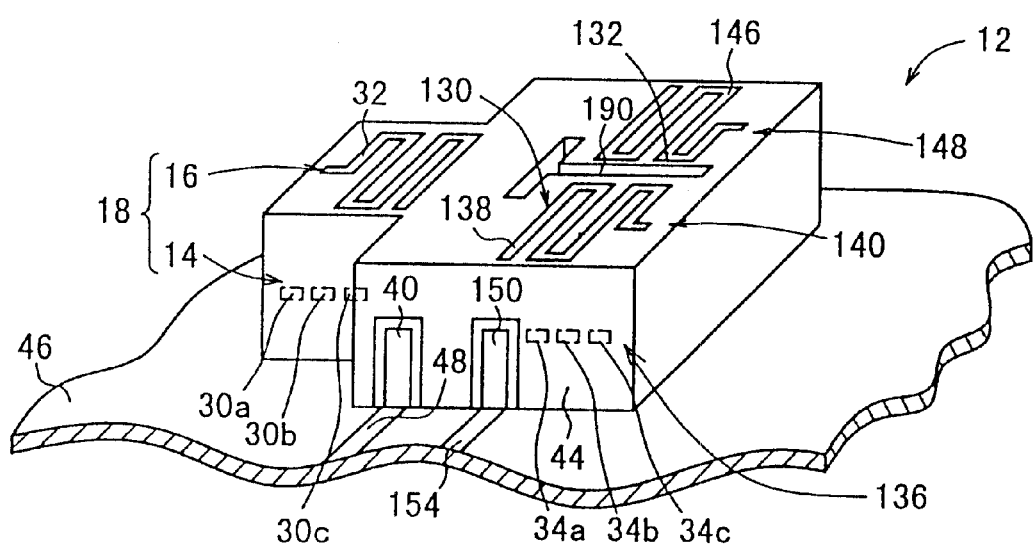
FIG. 11 is a perspective drawing showing the structure of a third alternative example of a transmitter-receiver according to the first embodiment.
Figure 12:
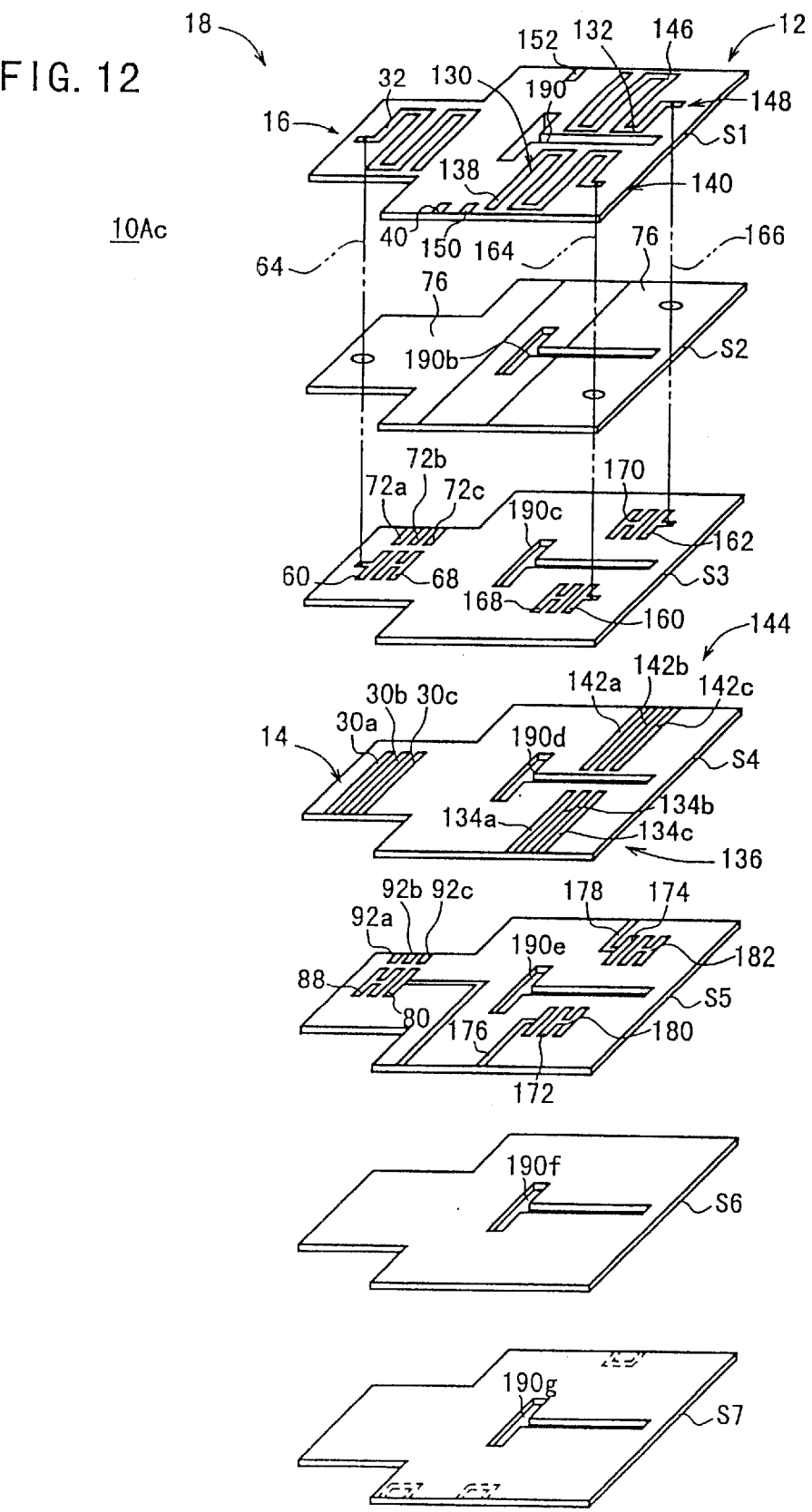
FIG. 12 is an exploded perspective drawing showing the structure of a third alternative example of a transmitter-receiver according to the first embodiment.

The following is a description of a third alternative example of the transmitter-receiver 10A according to the first embodiment, with references to FIGS. 11 and 12. Elements that correspond to those from FIGS. 8–10 will be assigned identical numerals and overlapping descriptions will be omitted.

As shown in FIG. 11, a transmitter-receiver 10Ac according to the third alternative example has roughly the same structure as the transmitter-receiver 10Ab according to the second alternative example (see FIG. 8). However, the transmitter-receiver 10Ac is different in that the transmitter antenna 16 is formed directly above the transmitter filter 14, the first receiver antenna 140 is formed directly above the first receiver filter 136, and the first receiver antenna 148 is formed directly above the second receiver filter 144.

As shown in FIG. 11, in the transmitter-receiver 10Ac according to the third alternative example the ground electrode 44 is formed on the outer side surface and the lower surface of the outer perimeter surface of the dielectric substrate 12, excluding the transmitter input terminal 40 and the first and the second receiver output terminal 150 and 152. Of course, a space is provided to keep the terminals 40, 150, and 152 isolated from the ground electrode 44.

As shown in FIG. 12, the inner layer ground electrode 76 is formed on a primary surface of the second dielectric layer S2 and is formed so that it is interposed between the transmitter antenna 16 and the transmitter filter 14, between the first receiver antenna 140 and the first receiver filter 136, and between the second receiver antenna 148 and the second receiver filter 144. The inner layer ground electrode 76 is not formed around at least the through-holes 64, 164, and 166, thus keeping the through-holes 64, 164, and 166 isolated.

In the transmitter-receiver 10Ac according to the third alternative example, the transmitter-receiver 10Ac having a plurality of receiver filters 136 and 144 and a plurality of receiver antennae 140 and 148 can be made more compact.

Figure 13:
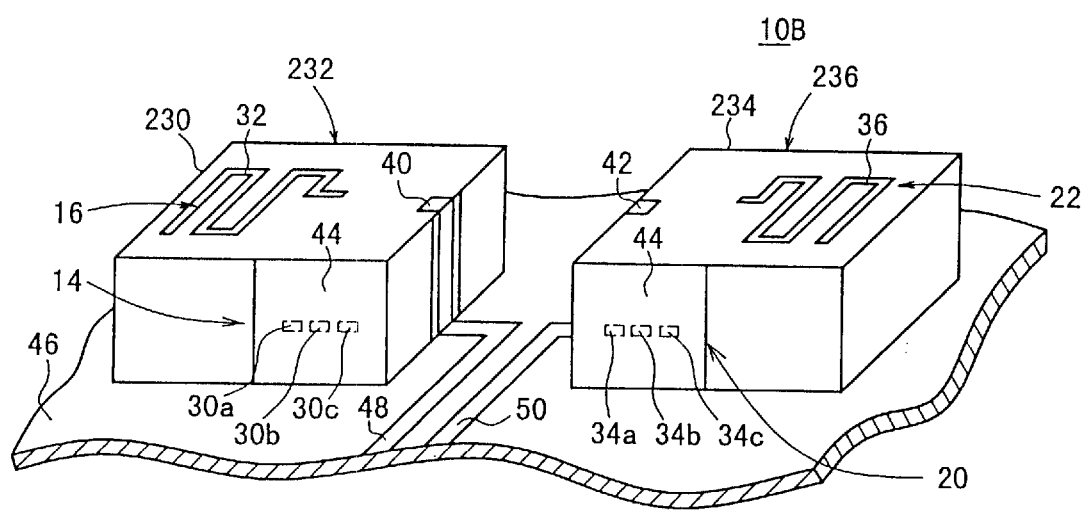
FIG. 13 is a perspective drawing showing the structure of a transmitter-receiver according to a second embodiment of the present invention.
Figure 14:
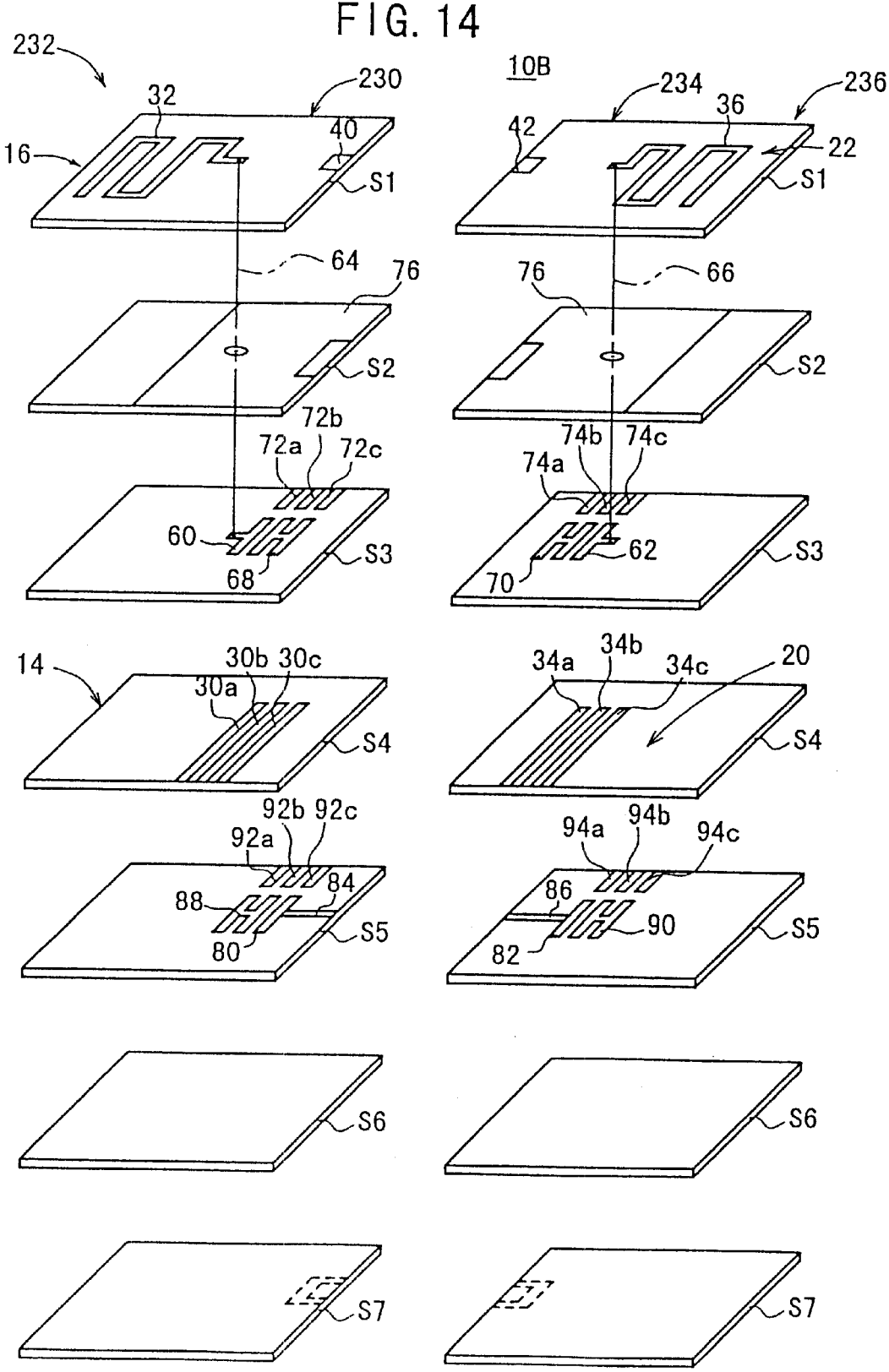
FIG. 14 is an exploded perspective drawing showing the structure of a transmitter-receiver according to the second embodiment.

The following is a description of a transmitter-receiver 10B according to a second embodiment, with references to FIGS. 13 and 14.

As shown in FIG. 13, the transmitter-receiver 10B according to the second embodiment includes a transmitter element 232 and a receiver element 236. In the transmitter element 232, a transmitter filter 14 and a transmitter antenna 16 connected to the transmitter filter 14 are formed integrally in a first dielectric substrate 230. In the transmitter filter 14, three ¼-wavelength resonant elements 30a–30c, each of which has one open end, are formed parallel to each other. In the receiver element 236, a receiver filter 20 and a receiver antenna 22 connected to the receiver filter 20 are formed integrally in a second dielectric substrate 234. In the receiver filter 20, three ¼-wavelength resonant elements 34a–34c, each of which has one open end, are formed parallel to each other.

In the transmitter element 232, the transmitter antenna 16 is formed to the left (with reference to FIG. 13) and the transmitter filter 14 is formed to the right. On the outer perimeter surface of the first dielectric substrate 230 is formed the transmitter input terminal 40, e.g. on the right side surface. On the outer side surfaces and the lower surface, excluding the transmitter input terminal 40, the ground electrode 44 is formed on the area corresponding to the receiver filter 14. Of course, an area is provided between the transmitter input terminal 40 and the ground electrode 44 to keep them isolated.

In the receiver element 236, the receiver antenna 22 is formed to the right, with reference to FIG. 13, and to the left is formed the transmitter filter 20. The receiver output terminal 42 is formed on the outer perimeter surface of the second dielectric substrate 234, e.g., on the left side surface. On the outer side surfaces and lower surface, excluding the receiver output terminal 42, the ground electrode 44 is formed at the area corresponding to the receiver filter 20. Of course, an area is provided between the receiver output terminal 42 and the ground electrode 44 to keep them isolated.

When the transmitter-receiver 10B according to the second embodiment is mounted on the circuit substrate 46, electrical connections are formed between the transmitter input terminal 40 of the transmitter element 232 and the transmitter circuit 48, between the receiver output terminal 42 of the receiver element 236 and the receiver circuit 50, and between the lower surfaces (ground electrode 44) of the first and the second dielectric substrates 230 and 234 and a ground line (not shown in the figure).

As shown in FIG. 14, the internal structures of the transmitter element 232 and the receiver element 236 are similar to those of the transmitter 18 and the receiver 24 of the transmitter-receiver 10A according to the first embodiment, so corresponding members will be assigned the same numerals and overlapping descriptions will be omitted.

In the transmitter-receiver 10B according to the second embodiment, adequate separation of reception and transmission signals can be provided with a simple structure. The transmitter-receiver 10B itself can be made compact, the structure can be simplified, and the production costs can be reduced.

Figure 15:
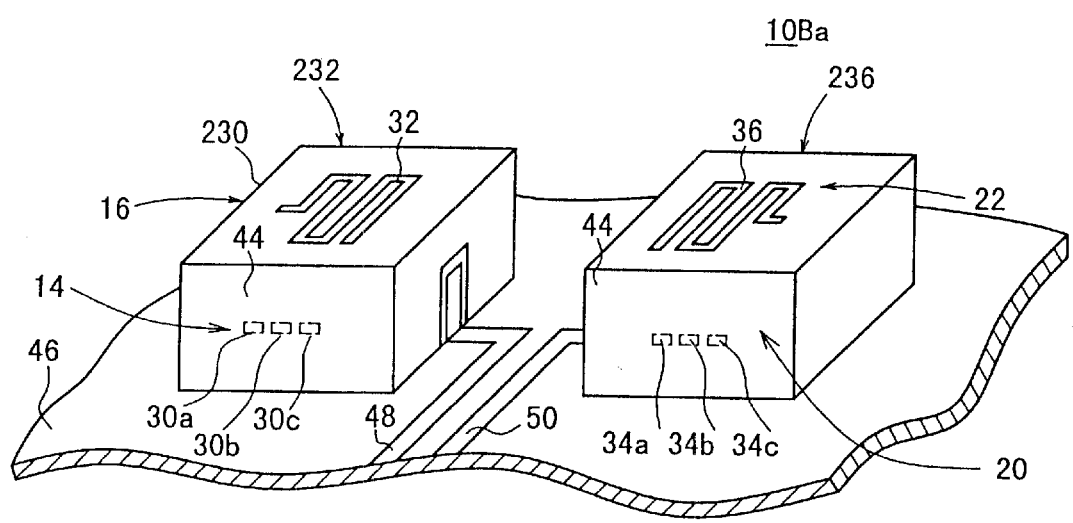
FIG. 15 is a perspective drawing showing the structure of a first alternative example of a transmitter-receiver according to the second embodiment.

As shown in the transmitter-receiver 10Ba according to a first alternative example in FIG. 15, in the transmitter element 232 the transmitter antenna 16 is formed directly above the transmitter filter 14, and, in the receiver element 236 the receiver antenna 22 is formed directly above the receiver filter 20. In this case, since the transmitter element 232 and the receiver element 236 can be made compact, communication devices or the like in which the transmitter-receiver 10Ba is implemented can be made compact.

Figure 16:
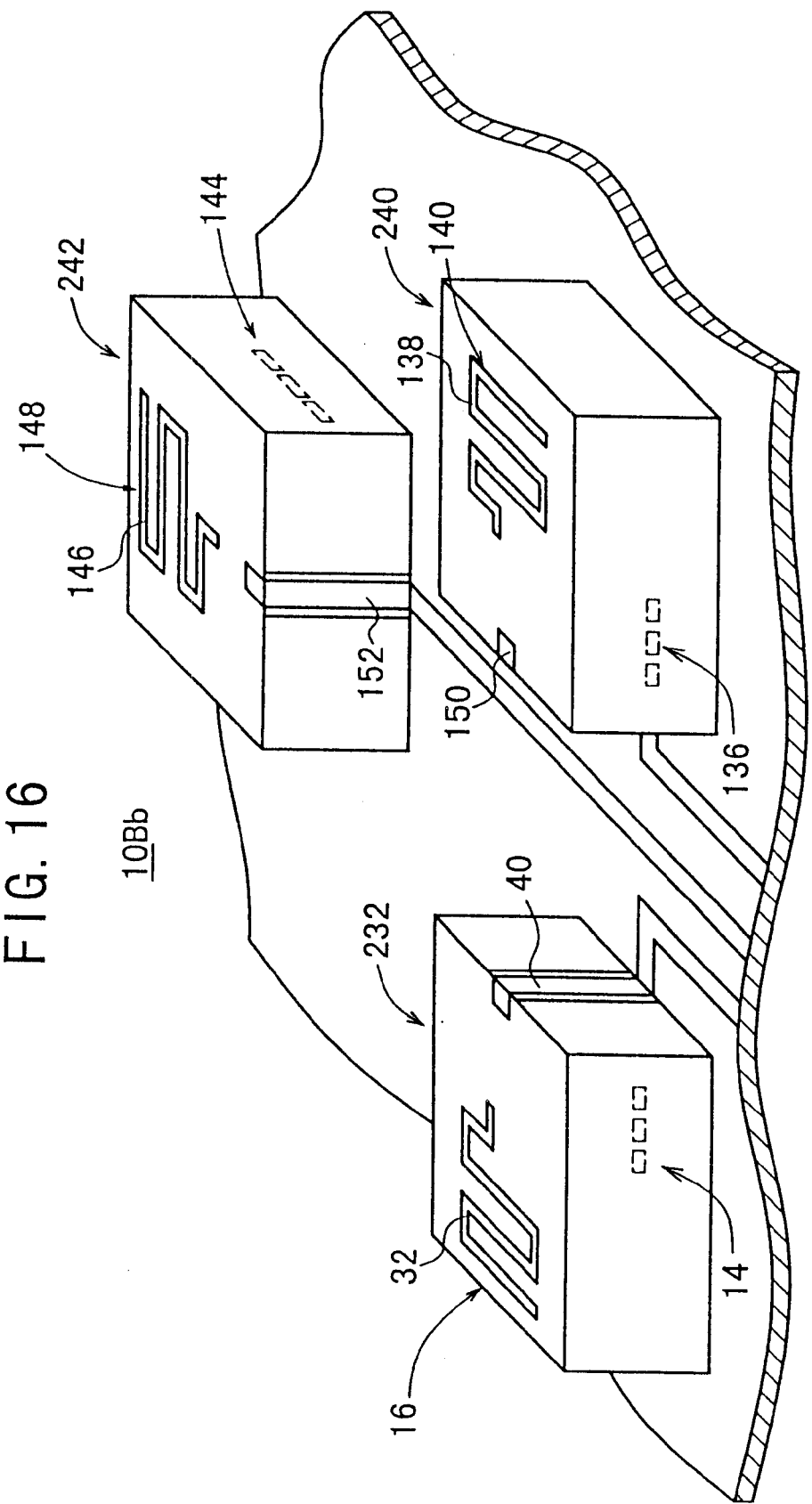
FIG. 16 is a perspective drawing showing the structure of a second alternative example of a transmitter-receiver according to the second embodiment.

As shown in FIG. 16, the transmitter-receiver 10Bb according to a second alternative example can also be formed with a single transmitter element 232 and two receiver elements (first and second receiver elements 240 and 242). In this case, as with the alternative example 10Aa of the transmitter-receiver 10A according to the first embodiment, a switching circuit 204 is connected below the first and the second receiver elements 240 and 242 so that the receiving element with the higher sensitivity can be selected.

Figure 17:
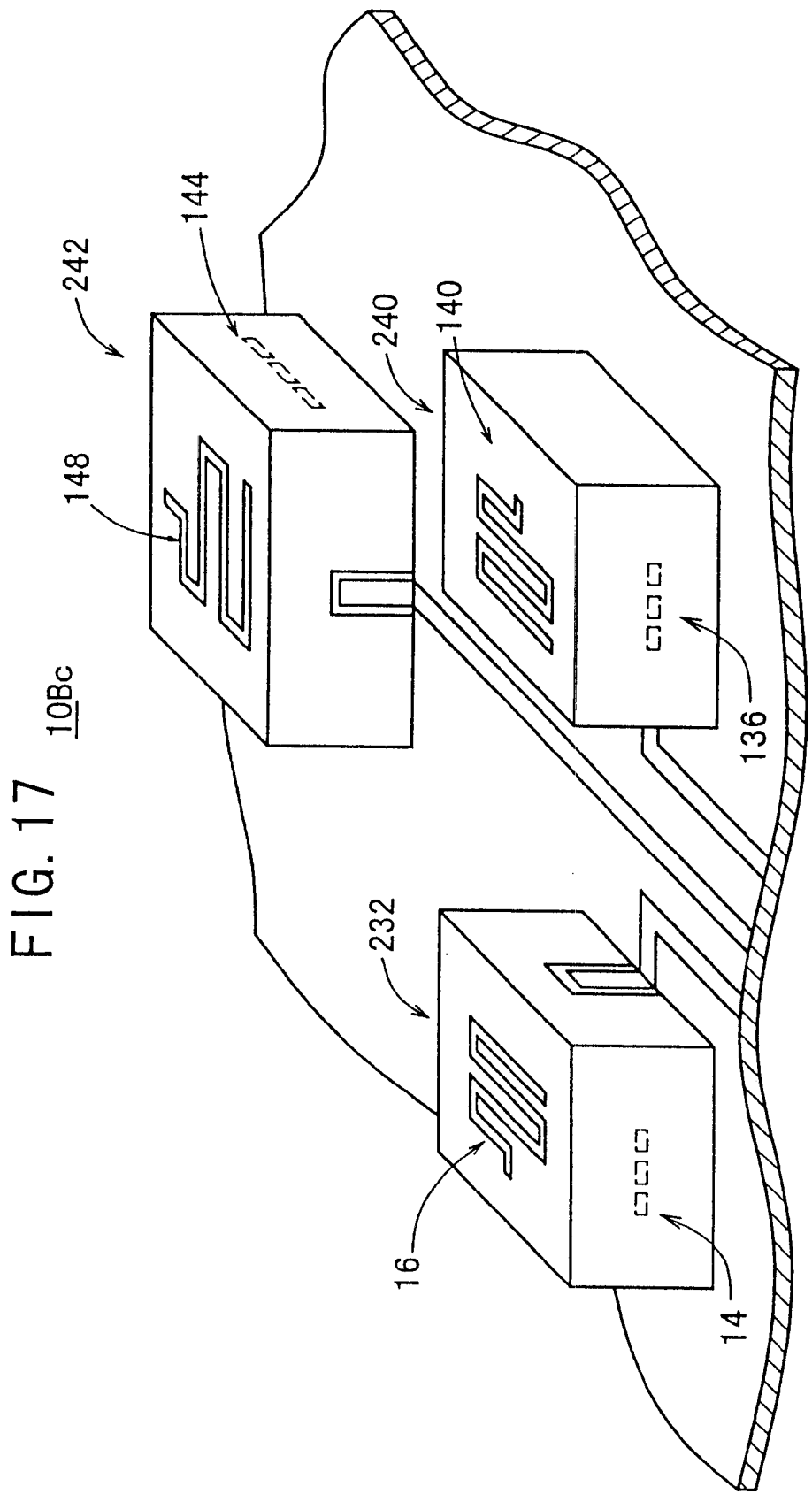
FIG. 17 is a perspective drawing showing the structure of a third alternative example of a transmitter-receiver according to the second embodiment.

Also, as shown in FIG. 17, the transmitter-receiver 10Bc according to a third alternative example, the transmitter-receiver 10Bb according to the second embodiment shown in FIG. 16 can have the transmitter antenna 16 formed directly above the transmitter filter 14 in the transmitter element 232, the first receiver antenna 140 formed directly above the first receiver filter 136 in the first receiver element 240, and the second receiver antenna 148 formed directly above the second receiver filter 144 in the second receiver element 242. With this structure, communication devices or the like containing a plurality of receiver elements 240 and 242 can be made more compact.

Figure 18:
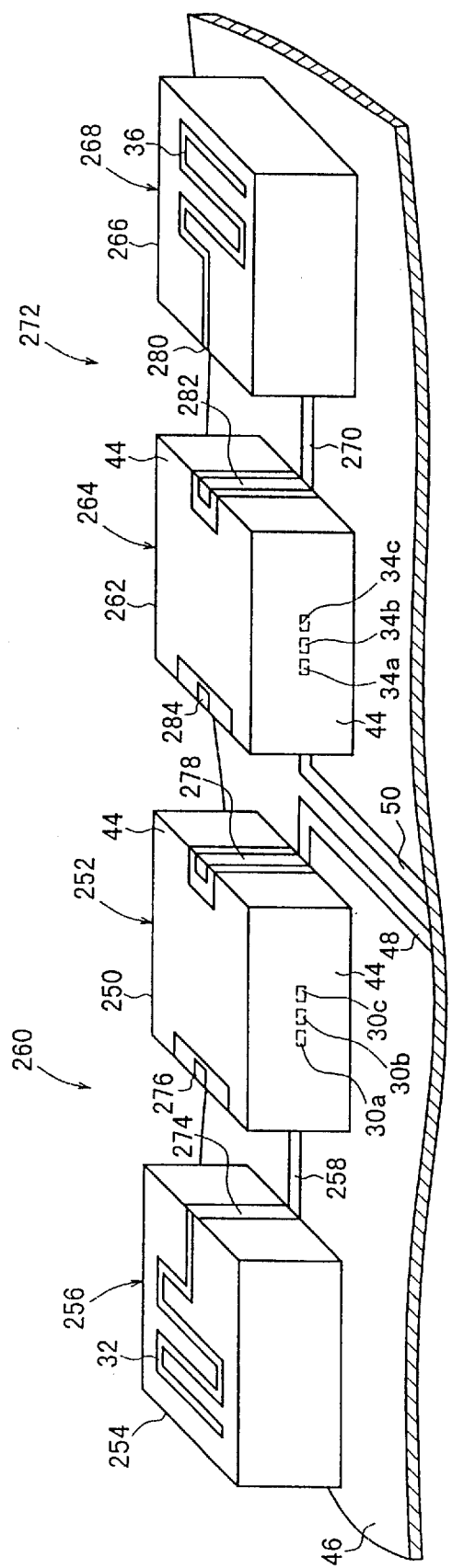
FIG. 18 is a perspective drawing showing the structure of a transmitter-receiver according to a third embodiment of the present invention.

The following is a description of a transmitter-receiver 10C according to a third embodiment, with reference to FIG. 18.

As shown in FIG. 18, the transmitter-receiver 10C according to the third embodiment includes a transmitter element 260 formed in a first transmitter dielectric substrate 250 and a receiver element 272 formed in a second receiver dielectric substrate 262. In the transmitter element 260, a transmitter filter element 252 and a transmitter antenna element 256 are electrically connected by a first strip line 258. In the transmitter filter element 252, three ¼-wavelength resonant elements 30a–30c, each of which has one open end, are formed parallel to each other. In the transmitter antenna element 256, a transmitter antenna 32 is formed on the upper surface of a second transmitter dielectric substrate 254. In the receiver element 272, a receiver filter element 264 and a receiver antenna element 268 are electrically connected by a second strip line 270. In the receiver filter element 264, three ¼-wavelength resonant elements 34a–34c, each of which has one open end, are formed parallel to each other. In the receiver antenna element 268, a receiver antenna 36 is formed on the upper surface of a second receiver dielectric substrate 266.

The transmitter antenna element 256 of the transmitter element 260 is formed with an antenna terminal 274 on the outer perimeter surface of the first transmitter dielectric substrate 254, e.g., on the right side surface as shown in FIG. 18.

With regard to the transmitter filter element 252 of the transmitter element 260, the transmitter output terminal 276 is formed on the outer perimeter surface of the second transmitter dielectric substrate 250, e.g., on the left side surface, and the transmitter input terminal 278 is formed on the right side surface. The ground electrode 44 is formed on the outer side surfaces and the lower surface, excluding these terminals.

With regard to the receiver antenna element 268 of the receiver element 272, the antenna terminal 280 is formed on the outer perimeter surface of the second receiver dielectric substrate 266, e.g., on the left side surface.

With regard to the receiver filter element 264 of the receiver element 272, the receiver input terminal 282 is formed on the outer perimeter surface of the second receiver dielectric substrate 262, e.g., on the right side surface. The receiver output terminal 284 is formed on the left side surface. The ground electrode 44 is formed on the outer side surfaces and the lower surface, excluding these terminals.

When the transmitter-receiver 10C according to the third embodiment is mounted on the circuit substrate 46, the antenna terminal 274 of the transmitter antenna element 256 and the transmitter input terminal 276 of the transmitter filter element 252 are electrically connected by the first strip line 258, and the transmitter output terminal 278 of the transmitter filter element 252 is electrically connected to the transmitter circuit 48.

Also, the antenna terminal 280 of the receiver antenna element 268 and the receiver output terminal 282 of the receiver filter element 264 are connected by the second strip line 270, and the receiver input terminal 284 of the receiver filter element 264 is electrically connected to the receiver circuit 50.

Furthermore, the lower surface (the ground electrode 44) of the first and the second transmitter dielectric substrate 250 is connected to a ground line (not shown in the figure).

The transmitter-receiver 10C according to this third embodiment also implements adequate separation of transmission and reception signals using a simple structure. The transmitter-receiver 10C itself can be more compact, simple in structure, and require reduced production costs.

Figure 19:
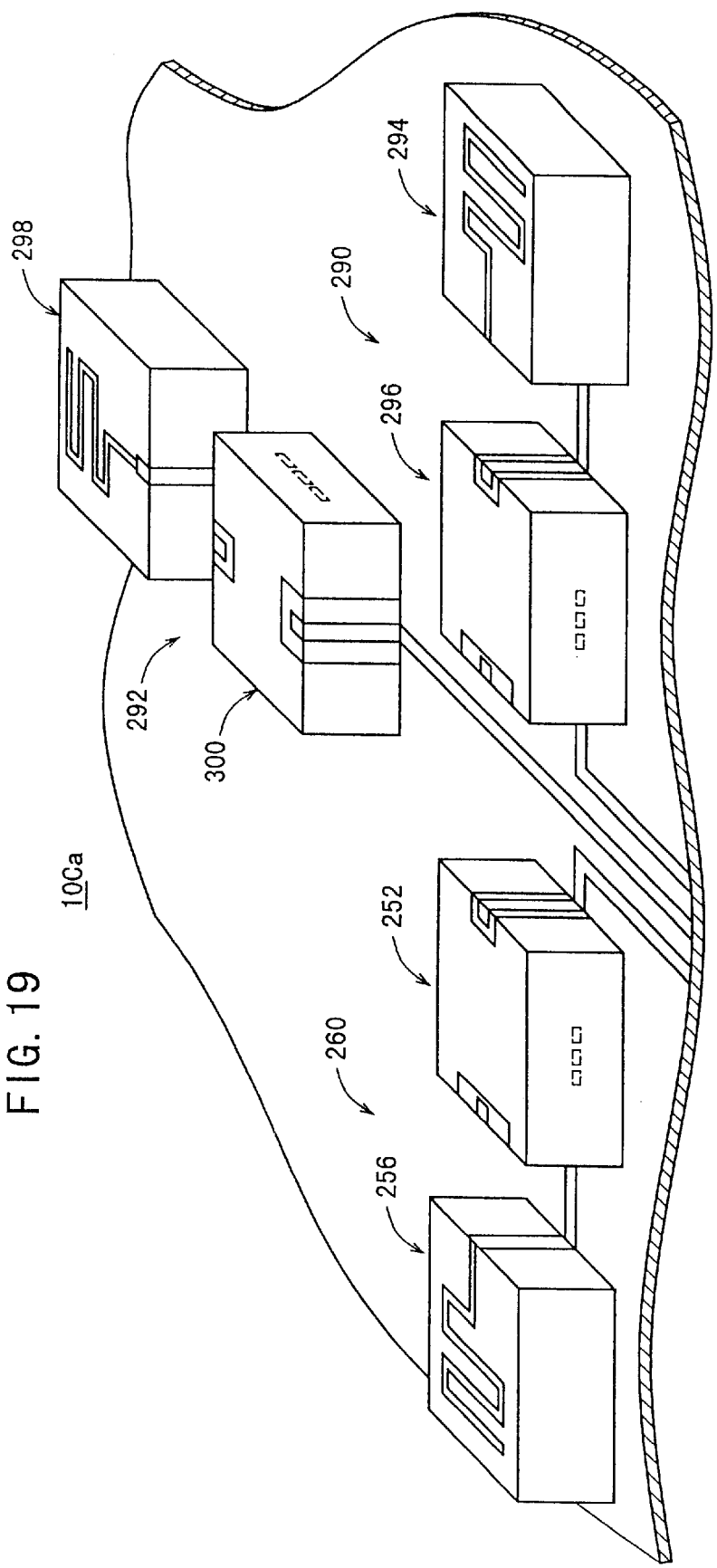
FIG. 19 is a perspective drawing showing the structure of an alternative example of a transmitter-receiver according to the third embodiment.

As shown in FIG. 19, a transmitter-receiver 10Ca according to an alternative example can be formed with a single transmitter element 260 and two receiver elements (first and second receiver elements 290 and 292). In this case, the first receiver element 290 includes a first receiver antenna element 294 and a first receiver filter element 296. The second receiver element 292 includes a second receiver antenna element 298 and a second receiver filter element 300.

As with the alternative example 10Aa of the transmitter-receiver 10A according to the first embodiment, in the transmitter-receiver 10Ca according to this alternative example a switching circuit 204 is connected below the two receiver elements 290 and 292 so that the receiver element having the higher sensitivity can be selected.

While the present invention has been particularly shown and described with reference to the preferred mode as illustrated in the drawings, it will be understood by one skilled in the art that various changes in detail may be effected therein without departing from the spirit and scope of the invention as defined by the claims.

What is claimed is:

1. A transmitter-receiver component comprising a transmitter element, including a transmitter filter and a transmitter antenna connected to said transmitter filter, and a receiver element, including a receiver filter and a receiver antenna connected to said receiver filter, wherein said transmitter element and said receiver element are formed integrally in a monolithic dielectric body.

2. The transmitter-receiver component of claim 1, wherein said transmitter filter and said transmitter antenna are formed in separate planar regions of said monolithic dielectric body, and said receiver filter and said receiver antenna are formed in separate planar regions of said monolithic dielectric body.

3. The transmitter-receiver component of claim 1, wherein said transmitter antenna is formed directly above said transmitter filter through an interposed shield electrode, and said receiver antenna is formed directly above said receiver filter through an interposed shield electrode.

4. The transmitter-receiver component of claim 1, further comprising a shield electrode formed between said transmitter element and said receiver element.

5. The transmitter-receiver component of claim 1, further comprising a gap formed between said transmitter element and said receiver element, and a shield electrode formed at least on an inner perimeter surface of said gap.

6. The transmitter-receiver component of claim 1, wherein said receiver element includes at least two receiver filters and at least two receiver antennae connected to said receiver filters, respectively.

7. The transmitter-receiver component of claim 6, wherein said transmitter filter and said transmitter antenna are formed in separate planar regions of said monolithic dielectric body, and said at least two receiver filters and said at least two receiver antennae are formed in separate planar regions of said monolithic dielectric body, respectively.

8. The transmitter-receiver component of claim 7, wherein said transmitter antenna is formed directly above said transmitter filter through an interposed shield electrode, and said receiver antennae are formed directly above said receiver filters, respectively, through interposed shield electrodes.

9. The transmitter-receiver component of claim 6, further comprising a shield electrode formed between said transmitter element and said receiver elements, and a shield electrode formed between said receiver elements.

10. The transmitter-receiver component of claim 6, further comprising a gap formed between said transmitter element and said receiver elements, a gap formed between said receiver elements, and a shield electrode formed at an inner perimeter surface of said gap.

11. The transmitter-receiver component of claim 1, wherein said transmitter antenna is independent of said receiver antenna.

12. A transmitter-receiver comprising:
a transmitter including a transmitter element having a transmitter filter electrically connected to a transmitter antenna, said transmitter filter being formed on a first transmitter dielectric body and said transmitter antenna being formed on a separate, second transmitter dielectric body;
a receiver including a receiver element having a receiver filter electrically connected to a receiver antenna, said receiver filter being formed on a first receiver dielectric body and said receiver antenna being formed on a separate, second receiver dielectric body; and
signal processing means for processing signals transmitted by said transmitter and received by said receiver.

13. The transmitter-receiver subassembly of claim 12, further comprising a second receiver element comprising a receiver filter electrically connected to a receiver antenna, said receiver filter being formed on a third receiver dielectric body and said receiver antenna being formed on a separate, fourth receiver dielectric body.

14. The transmitter-receiver of claim 13, further comprising a switching mechanism for selecting one of said two receiver filters based on sensitivity.

15. A transmitter-receiver subassembly comprising:
a substrate;
a transmitter element positioned on said substrate, said transmitter element comprising a transmitter filter electrically connected to a transmitter antenna, said transmitter filter being formed on a first transmitter dielectric body and said transmitter antenna being formed on a separate, second transmitter dielectric body; and
a receiver element positioned on said substrate, said receiver element comprising a receiver filter electrically connected to a receiver antenna, said receiver filter being formed on a first receiver dielectric body and said receiver antenna being formed on a separate, second receiver dielectric body.

16. The transmitter-receiver subassembly of claim 15, further comprising a second receiver element positioned on said substrate, said second receiver element comprising a receiver filter electrically connected to a receiver antenna, said receiver filter being formed on a third receiver dielectric body and said receiver antenna being formed on a separate, fourth receiver dielectric body.

17. A transmitter-receiver comprising:
a transmitter including a transmitter element having a transmitter filter and a transmitter antenna connected to said transmitter filter;
a receiver including a receiver element having a receiver filter and a receiver antenna connected to said receiver filter; and
signal processing means for processing signals transmitted by said transmitter and received by said receiver.

18. The transmitter-receiver of claim 17, wherein said transmitter element and said receiver element are formed integrally in a monolithic dielectric body.

19. The transmitter-receiver of claim 18, wherein said transmitter filter and said transmitter antenna are formed in separate planar regions of said monolithic dielectric body, and said receiver filter and said receiver antenna are formed in separate planar regions of said monolithic dielectric body.

20. The transmitter-receiver of claim 18, wherein said transmitter antenna is formed directly above said transmitter filter through an interposed shield electrode, and said receiver antenna is formed directly above said receiver filter through an interposed shield electrode.

21. The transmitter-receiver of claim 18, further comprising a shield electrode formed between said transmitter element and said receiver element.

22. The transmitter-receiver of claim 18, further comprising a gap formed between said transmitter element and said receiver element, and a shield electrode formed at least on an inner perimeter surface of said gap.

23. The transmitter-receiver of claim 17, wherein said receiver element includes at least two receiver filters and at least two receiver antennae connected to said receiver filters, respectively.

24. The transmitter-receiver of claim 23, further comprising a switching mechanism for selecting one of said two receiver filters based on sensitivity.

25. The transmitter-receiver of claim 23, wherein said transmitter element and said receiver element are formed integrally in a monolithic dielectric body.

26. The transmitter-receiver of claim 25, wherein said transmitter filter and said transmitter antenna are formed in separate planar regions of said monolithic dielectric body, and said at least two receiver filters and said at least two receiver antennae are formed in separate planar regions of said monolithic dielectric body, respectively.

27. The transmitter-receiver of claim 25, wherein said transmitter antenna is formed directly above said transmitter filter through an interposed shield electrode, and said receiver antennae are formed directly above said receiver filters, respectively, through interposed shield electrodes.

28. The transmitter-receiver of claim 25, further comprising a shield electrode formed between said transmitter element and said receiver elements, and a shield electrode formed between said receiver elements.

29. The transmitter-receiver of claim 25, further comprising a gap formed between said transmitter element and said receiver elements, a gap formed between said receiver elements, and a shield electrode formed at an inner perimeter surface of said gap.

30. The transmitter-receiver of claim 17, wherein said transmitter element is formed integrally in a first monolithic dielectric body, and said receiver element is formed integrally in a second monolithic dielectric body.

31. The transmitter-receiver of claim 30, wherein said transmitter filter and said transmitter antenna are formed in separate planar regions of said first monolithic dielectric body, and said receiver filter and said receiver antenna are formed in separate planar regions of said second monolithic dielectric body.

32. The transmitter-receiver of claim 30, wherein said transmitter antenna is formed directly above said transmitter filter through an interposed dielectric layer, and said receiver antenna is formed directly above said receiver filter through an interposed dielectric layer.

33. The transmitter-receiver of claim 30, further comprising a second receiver element including a receiver filter and a receiver antenna connected to said receiver filter, said receiver filter and said receiver antenna being formed integrally in a third monolithic dielectric body.

34. The transmitter-receiver of claim 33, further comprising a switching mechanism for selecting one of said two receiver filters based on sensitivity.

35. The transmitter-receiver component of claim 17, wherein said transmitter antenna is independent of said receiver antenna.

36. A transmitter-receiver subassembly comprising:
a substrate;
a transmitter element positioned on said substrate, said transmitter element including a transmitter filter and a transmitter antenna connected to said transmitter filter, said transmitter filter and said transmitter antenna being formed integrally in a first monolithic dielectric body; and
a receiver element positioned on said substrate, said receiver element including a receiver filter and a receiver antenna connected to said receiver filter, said receiver filter and said receiver antenna being formed integrally in a second monolithic dielectric body.

37. The transmitter-receiver subassembly of claim 36, wherein said transmitter filter and said transmitter antenna are formed in separate planar regions of said first monolithic dielectric body, and said receiver filter and said receiver antenna are formed in separate planar regions of said second monolithic dielectric body.

38. The transmitter-receiver subassembly of claim 36, wherein said transmitter antenna is formed directly above said transmitter filter through an interposed dielectric layer, and said receiver antenna is formed directly above said receiver filter through an interposed dielectric layer.

39. The transmitter-receiver subassembly of claim 36, further comprising a second receiver element positioned on said substrate, said second receiver element including a receiver filter and a receiver antenna connected to said receiver filter, said receiver filter and said receiver antenna being formed integrally in a third monolithic dielectric body.

* * * * *